United States Patent
Lopez (10) Patent No.: US 9,625,041 B1
(45) Date of Patent: Apr. 18, 2017

(54) WEARLESS MULTI-PORT WATER DISTRIBUTION VALVE

(71) Applicant: Pool Patch LLC, Phoenix, AZ (US)

(72) Inventor: Thomas V. Lopez, Phoenix, AZ (US)

(\*) Notice: Subject to any disclaimer, the term of this patent is extended or adjusted under 35 U.S.C. 154(b) by 0 days.

(21) Appl. No.: 14/819,338

(22) Filed: Aug. 5, 2015

(51) Int. Cl.
| | | |
|---|---|---|
| *F16K 11/02* | (2006.01) | |
| *F16K 11/074* | (2006.01) | |
| *F16K 11/06* | (2006.01) | |
| *E04H 4/12* | (2006.01) | |
| *E04H 4/16* | (2006.01) | |

(52) U.S. Cl.
CPC ............... *F16K 11/06* (2013.01); *E04H 4/12* (2013.01); *E04H 4/16* (2013.01); *Y10T 137/269* (2015.04); *Y10T 137/86501* (2015.04); *Y10T 137/86517* (2015.04)

(58) Field of Classification Search
CPC ...... F16K 11/06; F16K 11/072; F16K 11/074; Y10T 137/269; Y10T 137/86445; Y10T 137/86517; Y10T 137/86533; Y10T 137/86911; Y10T 137/86501
See application file for complete search history.

(56) References Cited

U.S. PATENT DOCUMENTS

| | | | | |
|---|---|---|---|---|
| 4,077,424 | A * | 3/1978 | Ehret | F16K 11/074 137/119.07 |
| 4,458,708 | A * | 7/1984 | Leonard | F15D 1/14 137/118.06 |
| 4,817,656 | A | 4/1989 | Gould | |
| 6,189,556 | B1 | 2/2001 | Blake et al. | |
| 6,311,728 | B1 * | 11/2001 | Goettl | F16K 11/074 137/119.07 |
| 6,325,087 | B1 | 12/2001 | Tarr | |
| 6,539,967 | B2 | 4/2003 | Tarr | |
| 8,714,182 | B2 | 5/2014 | Malinasky, Jr. | |
| 9,222,274 | B1 * | 12/2015 | Goettl | E04H 4/16 |

\* cited by examiner

*Primary Examiner* — John K Fristoe, Jr.
*Assistant Examiner* — Seth W Mackay-Smith
(74) *Attorney, Agent, or Firm* — Thomas W. Galvani, P.C.; Thomas W. Galvani (57) ABSTRACT

A wearless water distribution valve directs a flow of water through a swimming pool cleaning system and includes a housing having an inlet, outlets, and an inner surface bounding and defining an interior coupled in fluid communication with the inlet and the outlets. The valve further includes a disc having a port, and being mounted for rotation in the housing for movement among a plurality of positions, each position of the disc characterized by the port being aligned with a respective one of the outlets. The valve further includes a drive assembly carried by the housing and operably coupled to impart rotation to the disc. In response to application of the flow of water into the housing, actuation of the drive assembly imparts rotation to the disc through the plurality of positions. The disc is disposed in spaced relation away from the inner surface of the housing.

17 Claims, 7 Drawing Sheets

WEARLESS MULTI-PORT WATER DISTRIBUTION VALVE

FIELD OF THE INVENTION

The present invention relates generally to swimming pools, and more particularly to valves for use with pool pump assemblies in swimming pools having in-floor cleaning systems.

BACKGROUND OF THE INVENTION

There are many ways to clean a pool, and pool owners are continually looking for easier ways to do so. Pools can be cleaned by hand, such as by brushing the pool surface with a brush fit on the end of a long pole. This causes debris and material collected on the pool surface to be lifted off the surface; when the pool pump and filter assembly is operated in conjunction with this practice, water and debris together are drawn through the pool pump into a filter which filters and collects much of the debris, thereby removing it from the pool and rendering the pool cleaner. Brushing can be laborious and time-consuming, however.

Automatic pool vacuums were developed to reduce the work of pool owners. Pool vacuums operate in a number of different ways, but most creep along the pool surface and suck, or disturb and then suck, debris and material collected on the pool surface up a hose into the operating pump and filter assembly. Vacuums can be difficult to operate, however. They must be calibrated to provide sufficient suction, they must be maintained, they are vulnerable to jamming from large debris, and they can provide a random cleaning pattern that may be inadequate.

In-floor cleaning heads were developed as an automated, low-oversight way to keep a pool surface clean. In-floor cleaning heads are outlets that are permanently installed in the swimming pool structure. The heads recede into the pool structure when not in use, and pop up when operating. Although there are a great number of kinds of pop-up heads, most operate with the basic functionality of directing a stream of water across a portion of the pool surface to clean that portion of the pool surface. Some heads rotate to direct that stream across different portions of the pool surface. Typically, the heads are installed in a number of locations across a pool surface, and often clusters of heads are grouped together in "lines," with each line including heads that receive water independently of the heads in other lines. This independent operation of lines requires a way to provide a flow of water to each line independently, and so swimming pool distribution valves were developed.

Swimming pool distribution valves generally have an inlet, a plurality of outlets, and some internal mechanism for directing the flow of water from the inlet to each of the outlets independently. However, many swimming pool distribution valves are susceptible to wear, which requires laborious maintenance or difficult replacement. An improved water distribution valve is needed.

SUMMARY OF THE INVENTION

A wearless water distribution valve directs a flow of water through a swimming pool cleaning system and includes a housing having an inlet, outlets, and an inner surface bounding and defining an interior coupled in fluid communication with the inlet and the outlets. The valve further includes a disc having a port, and being mounted for rotation in the housing for movement among a plurality of positions, each position of the disc characterized by the port being aligned with a respective one of the outlets. The valve further includes a drive assembly carried by the housing and operably coupled to impart rotation to the disc. In response to application of the flow of water into the housing, actuation of the drive assembly imparts rotation to the disc through the plurality of positions. The disc is disposed in spaced relation away from the inner surface of the housing.

BRIEF DESCRIPTION OF THE DRAWINGS

Referring to the drawings.

DETAILED DESCRIPTION

Figure 1A:
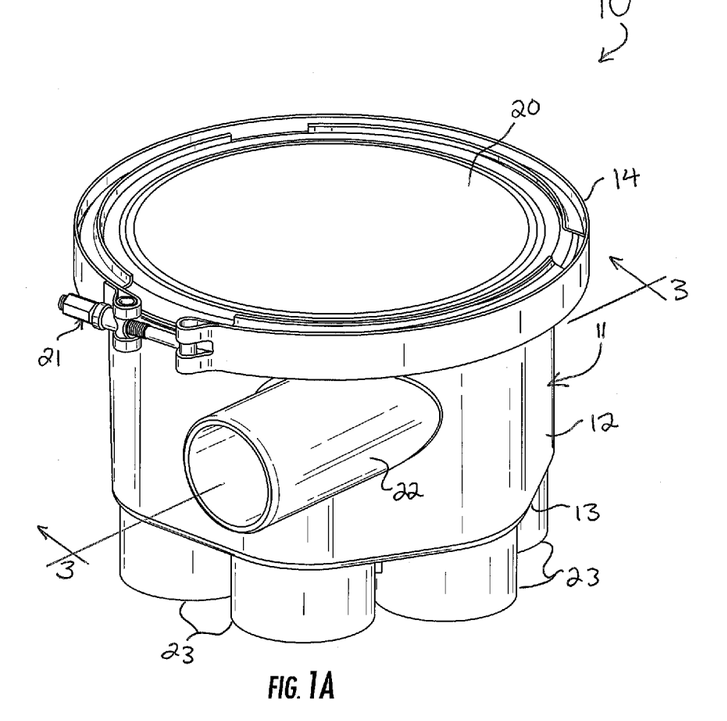
FIGS. 1A and 1B are top and bottom perspective views of a wearless multi-port water distribution valve, respectively.
Figure 1B:
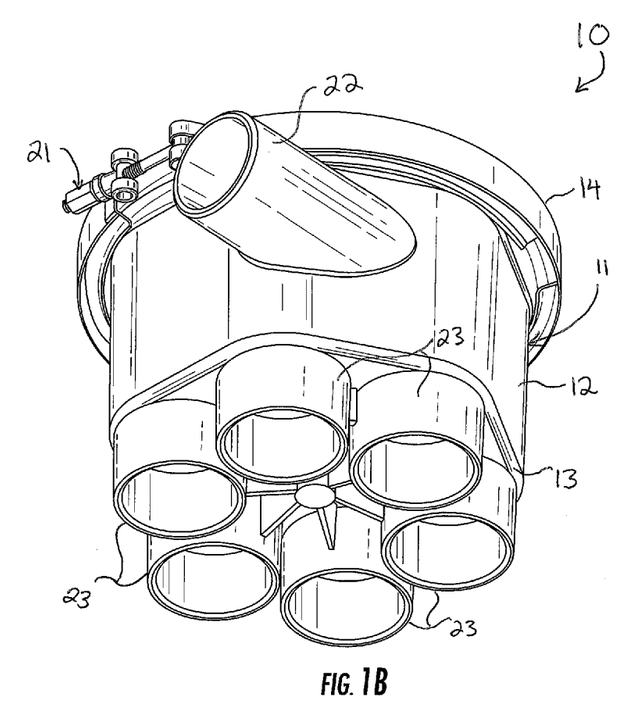

Reference now is made to the drawings, in which the same reference characters are used throughout the different figures to designate the same elements. FIGS. 1A and 1B are top and bottom perspectives of a wearless multi-port water distribution valve 10 for directing a flow of water from a pump in a swimming pool cleaning assembly among several conduits of a piping assembly, each of which leads to a line of in-floor cleaning heads installed in the swimming pool. The valve 10 is useful for sequentially communicating water to each in-floor cleaning head to clean the pool surface of dirt, debris, growth, and other material without succumbing to internal wear, and without causing wear to any parts which permanently fixed to the pool structure or the pump assembly. In this way, maintenance of the valve 10 does not eventually require laborious replacement of the valve, which typically involves cutting the conduits to remove a worn valve, obtaining a new valve, and plumbing the new valve into the cut conduits.

The valve 10 includes a generally symmetric housing 11 having a sidewall 12 extending between a bottom 13 and a lip defining a top 14 of the housing 11. The housing 11 bounds and defines an interior 15, shown in FIG. 2, and a lid 20 covers and encloses the interior 15 at the top 14. The lid 20 is releasably secured on the housing 11 with a clamp ring 21.

Referring still to FIGS. 1A and 1B, a lateral inlet 22 is formed in the sidewall 12 in fluid communication with the interior 15, and six downwardly extending outlets 23 are formed in the bottom 13 of the housing 11, also in fluid communication with the interior 15. Each of the inlet 22 and outlets 23 are cylindrical ports sized to interface and engage easily with conventional swimming pool plumbing conduits, which are typically arranged in a circumferentially-spaced apart, radial arrangement. The pump of the swimming pool cleaning assembly pumps water through the inlet 22 into the interior 15 and then sequentially out each of the outlets 23 to each of the in-floor cleaning heads installed in the swimming pool.

Figure 2:
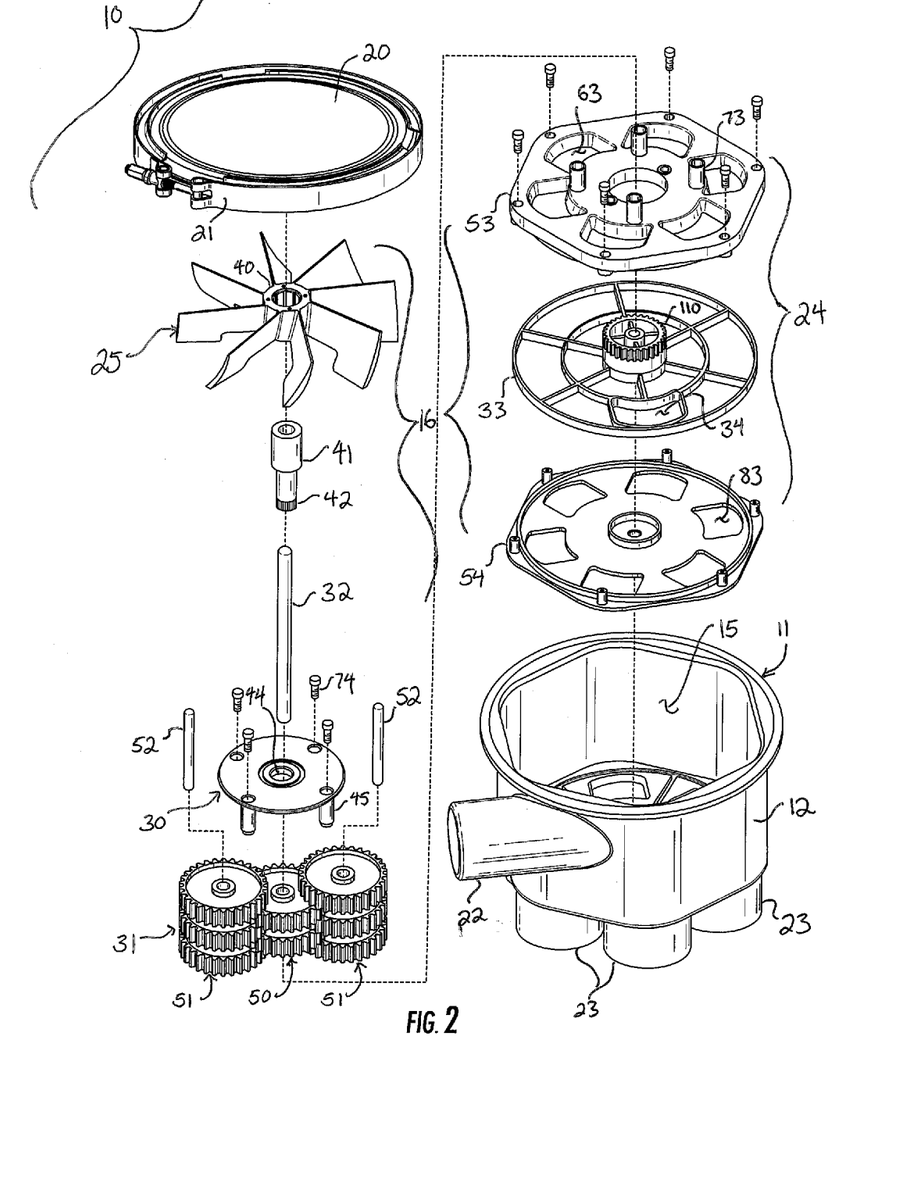
FIG. 2 is an exploded top perspective view of the valve of FIG. 1A.

Referring now to FIG. 2, the housing 11 and the lid 20 cooperate with a distribution assembly 16 carried in the interior 15 to sequentially and cyclically communicate water from the inlet 22 to each of the outlets 23 so that the surface of the swimming pool is cleaned. The housing 11, which in operation is plumbed to the conduits leading to the cleaning heads, carries a cartridge 24 which separates moving parts of the valve 10 from interaction with the housing 11 so as to prevent wear to the housing 11. The distribution assembly 16 sequentially and cyclically communicates water from the inlet to the outlets 23 include the cartridge 24, but also includes an impeller 25, a table 30, and a reduction cassette 31, each mounted around a central axle 32. The cartridge 24, also mounted around the central axle 32, carries a disc 33 which is mounted for rotation, and does rotate entirely within the cartridge 24 so as not to engage the sidewall 12 of the housing 11 or rub against the sidewall 12 of the housing 11. The disc 33 includes a single port 34 which extends entirely through the disc 33 to selectively allow water to pass through the disc 33 from the inlet 22 to the outlets 23, as will be explained in detail herein. As the disc 33 rotates within the cartridge 24, the port 34 sequentially moves into alignment with each of the outlets 23, so as to allow water from the interior 15 out the respective outlet 23. The cartridge 24 and the disc 33 define an operational assembly 17 within the distribution assembly to render the valve 10 operable to distribute water.

Figure 3:
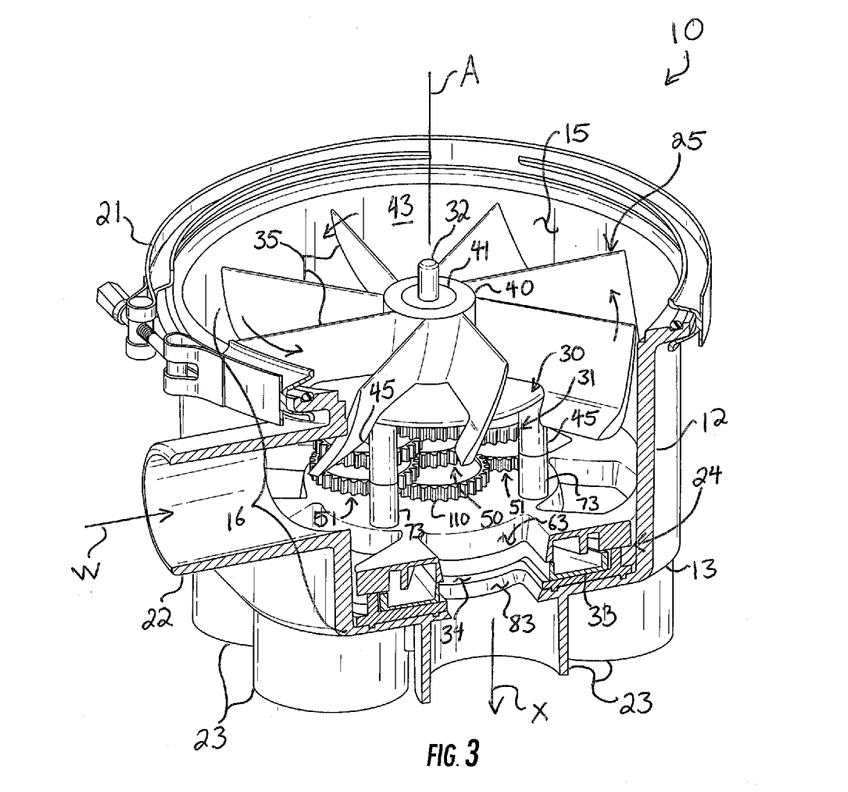
FIG. 3 is a top perspective, section view of the valve of FIG. 1A taken along the line 3-3 in FIG. 1A.

Turning now to FIG. 3, which is a section view of the valve 10 taken along the line 3-3 in FIG. 1A, the arrangement of the distribution assembly 16 of the valve 10 is shown. The lid 20 has been removed for clarity of the illustration. The impeller 25 is proximate to the top 14, generally parallel with respect to the inlet 22. The impeller 25 includes a plurality of canted blades 35 formed integrally to and extending radially outward from a hub 40 fixed on a drive fitting 41. The drive fitting 41 is mounted for free rotation on the axle 32, so that the impeller 25 is mounted for free rotation on the axle 32. The drive fitting 41 is more clearly shown in FIG. 2, where it can be seen that the drive fitting 41 includes an enlarged top portion, to which the hub 40 of the impeller 25 is secured, and a lower, monolithically-formed drive gear 42. The drive gear 42 is coupled in meshing engagement with the reduction cassette 31. The impeller 25 thus rotates on the axle 32 to drive the reduction cassette 31.

Returning to FIG. 3, application of water through the inlet 22 along line W causes the impeller 25 to rotate in a counter-clockwise manner, as indicated with rotational arrows in FIG. 3, thereby imparting rotation to each gear of the reduction cassette 31. The axle 32 is aligned along an axis A, and for purposes of orientation, various terms used herein will be used in reference to the axis A, such as "horizontal," which means extending generally perpendicular to the axis A, "vertical," which means extending generally parallel to the axis A, "radial," which means extending horizontally outward from or inward to the axis A, and "circumferential," which means extending in a horizontal arc defined by the axis A.

In the preferred embodiment shown throughout the drawings, the impeller 25 includes eight blades 35, but one having ordinary skill in the art will readily appreciate that a fewer or greater number of blades 35 may be used so long as performance of the valve 10 is comparable. The blades 35 each have a length in the radial direction which is shorter than the shortest radial distance between the axis A and the sidewall 12, such that the blades 35 can rotate without impact, wear, rubbing, or other interference with an inner surface 43 of the sidewall 12, thereby ensuring the continuous, uninterrupted rotation or the impeller 25 as well as the prevention of wear to the inner surface 43 of the sidewall 12. The inner surface 43 of the sidewall 12 is generally hexagonal.

Still referring to FIG. 3, the impeller 25 is disposed above the table 30. The table 30 has a diameter less than the diameter of the impeller 25; the table 30 is approximately one-half as wide as the impeller 25 and approximately one-third as wide as the housing 11. The table 30 prevents the impeller 25 from moving downward on the axle 32 and also contains the reduction cassette 31 in vertical movement. The table 30 is formed with a coaxial bore 44 (seen in FIG. 2) through which the drive fitting 41 extends on the axle 32 to engage with the reduction cassette 31. The table 30 also includes four posts 45 which are supported by the cartridge 24 below and space the table 30 above the cartridge 24. Within the space between the table 30 and the cartridge 24, the reduction cassette 31 operates to convert the relatively fast rotation of the impeller 25 into relatively slow rotation of the disc 33 within the cartridge 24.

The reduction cassette 31 includes a vertically-stacked set of central gears 50 meshingly engaged with two vertically-stacked sets of offset gears 51. Each of the central and offset gears 50 and 51 includes an upper large gear integrally formed to a lower small gear, such that the large gears of the central gears 50 engage with the small gears of the offset gears 51, and the small gears of the central gears 50 engage with the large gears of the offset gears 51. The central gears 50 are mounted for free rotation on the axle 32, and the offset gears 51 are mounted for free rotation on shafts (seen in FIG. 2) which are fit into and contained from vertical movement by the table 30 and the cartridge 24. The impeller 25, the drive fitting 41, and the reduction cassette 31 are thus elements of a drive assembly carried by the housing 11 and operably coupled to the disc 33 in the cartridge 24 so as to impart rotation to the disc 33 within the cartridge 24 in response to application of water through the valve 10 and consequential actuation of the drive assembly. The central gears 50 and the offset gears 54 are mounted just above the cartridge 24 on the axle 32 and the shafts 52, respectively, which are secured in place. The reduction cassette 31 is thereby contained vertically between the table 30 and the cartridge 24.

Figure 4:
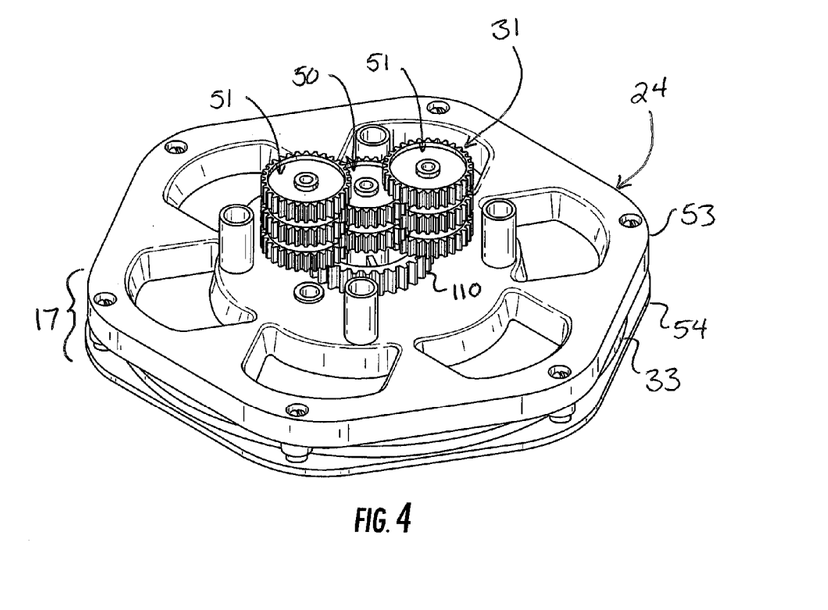
FIG. 4 is a top perspective view showing, in isolation, a cartridge and reduction cassette carried in the valve of FIG. 1A.
Figure 5A:
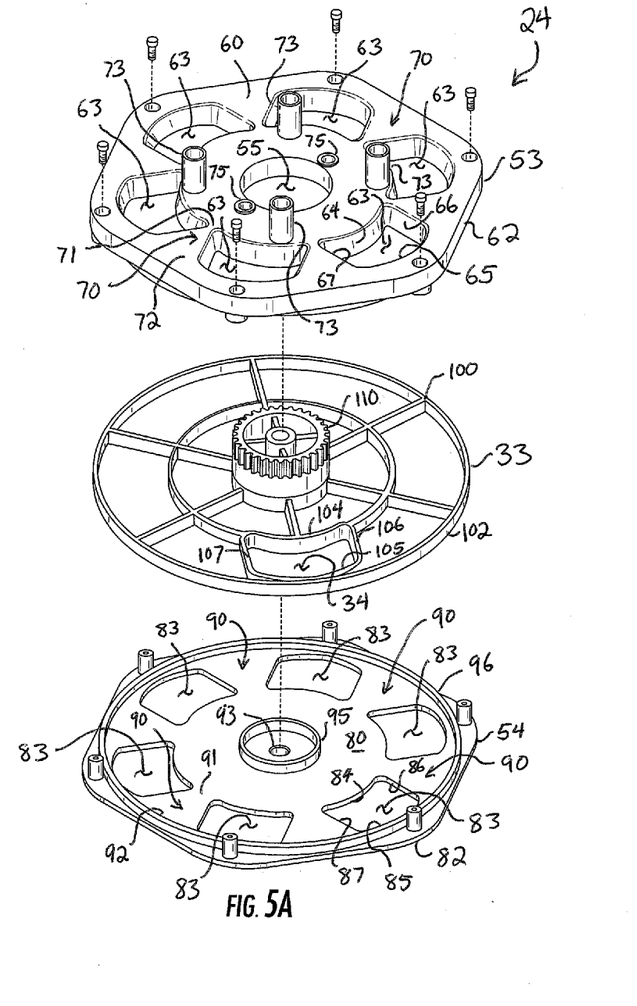
FIGS. 5A and 5B are exploded, top and bottom perspective views, respectively, of the cartridge of FIG. 4.
Figure 5B:
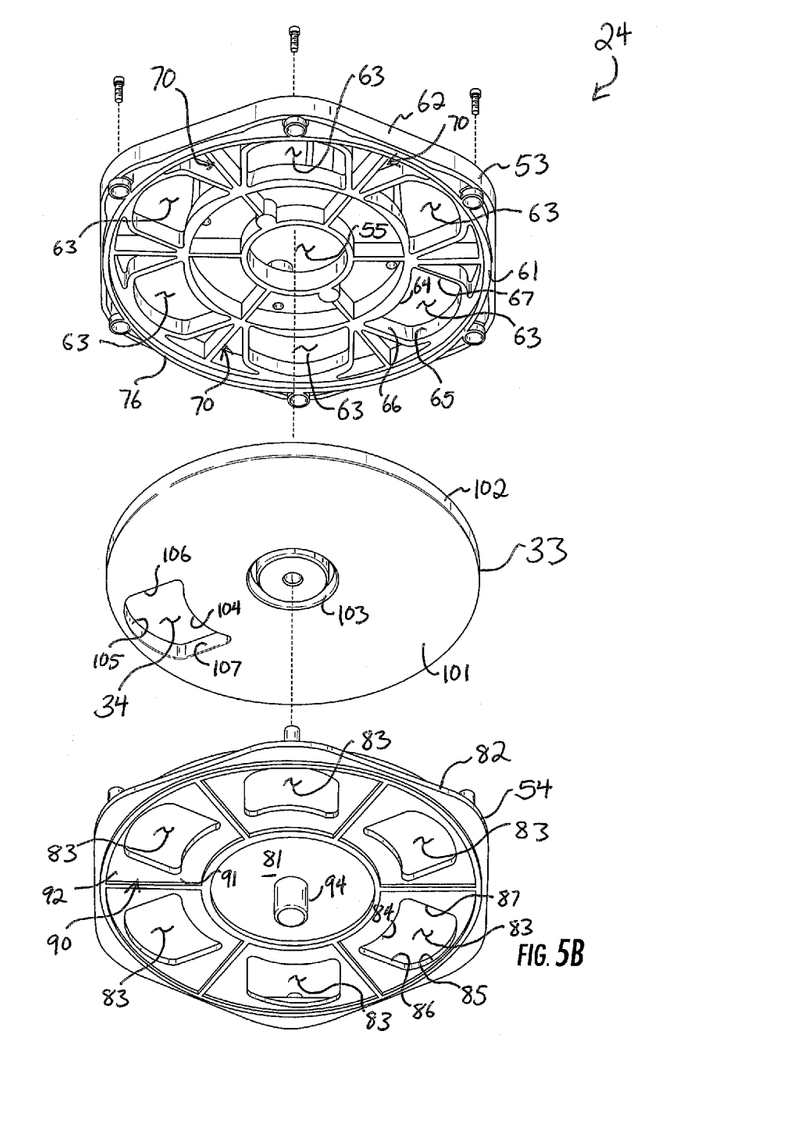

Turning to FIGS. 4, 5A, and 5B, the cartridge 24 is shown in detail. In FIG. 4, the cartridge 24 is shown together with the reduction cassette 31 mounted atop the cartridge 24. The cartridge 24, and the reduction cassette 31, are removable from the housing 11 and may be replaced if either wears out. Neither wears against nor engages with the housing 11 in a manner in which the housing 11 itself is worn, so that the housing 11 need not be replaced. The cartridge 24 and the reduction cassette 31 are applicable to the housing 11 to render the valve 10 operable.

The cartridge 24 includes a top plate 53, an opposed bottom plate 54, and the disc 33 interposed therebetween. The reduction cassette 31 is mounted on top of the top plate 53. Turning to FIGS. 5A and 5B, the top plate 53 includes an upper surface 60, an opposed lower surface 61, a perimeter edge 62, and a large central bore 55. The top plate 53 is generally hexagonal prismatic, such that the perimeter edge 62 includes six sides which correspond in dimension to the hexagonal inner surface 43 of the sidewall 12 of the housing 11 into which the top plate 53 is snug fit as part of the cartridge 24. The snug fit between the top plate 53 and the inner surface 43 of the sidewall 12 prevents water from flowing from the inlet 22 to the outlets 23 around the cartridge 24. The top plate 53 has a relatively thin profile. The top plate 53 includes six apertures 63. The apertures 63 are identical in every way other than location, and so only one aperture 63 will be described and referenced herein specifically, with the understanding that the description is equally applicable to the other apertures 63 unless otherwise noted. Additionally, not every aperture 63 will be marked with reference characters, for the sake of clarity of the drawings.

The aperture 63 is generally rectangular and extends vertically entirely through the top plate 53. The aperture 63 is disposed between the perimeter edge 62 and the central bore 55. The aperture 63 has an inner edge 64, an opposed outer edge 65, and opposed parallel sides 66 and 67. The inner edge 64 and the outer edge 65 are each curved such that the inner edge 64 forms a convex edge of the aperture 63 and the outer edge 65 forms a concave edge of the aperture 63. The sides 66 and 67 are parallel and arranged nearly radially with respect to the axis A. The sides 66 and 67 are tangential to the central bore 55 of the top plate 53 and are generally transverse to the inner and outer edges 64 and 65.

As stated above, each of the apertures 63 is identical in structure. In location, the apertures 63 are spaced apart circumferentially about the central bore 55, each separated by a solid wedge 70. Each wedge 70 is formed integrally and monolithically as part of the top plate 53. The wedges 70 are identical in every way other than location, and so only one wedge 70 will be described and referenced herein specifically, with the understanding that the description is equally applicable to the other wedges 70 unless otherwise noted. Additionally, not every wedge 70 will be marked with reference characters for the sake of clarity of the drawings. The wedge 70 has an inner end 71 and an outer end 72. The inner end 71 is proximate to the central bore 55 and is defined between the inner edges 64 of two adjacent apertures 63. The outer end 72 is proximate to the perimeter edge 62 and is defined between the outer edges 65 of the same two adjacent apertures 63. The inner end 71 is narrower than the outer end 72, such that the wedge 70 expands in width from the inner end 71 to the outer end 72. The inner end 71 is approximately one-sixth the circumferential width of the inner edge 64 of one of the apertures 63. The outer end 72 is approximately two-thirds the circumferential width of the outer edge 65 of one of the apertures 63. Thus, the horizontal area of the wedge 70 is approximately one-third the horizontal area of one of the apertures 63.

The top plate 53 includes four posts 73 which snap into and engage with the four posts 45 on the underside of the table 30 via fasteners 74, as seen in FIGS. 2 and 3. The top plate 53 is also formed with two sockets 75 into which the shafts 52 are seated. The top plate 53 further includes a circumferential lip 76 depending from the lower surface 61. The lip 76 contains the disc 33 at the top plate 53.

Referring primarily to FIGS. 5A and 5B still, the bottom plate 54 includes an upper surface 80, an opposed lower surface 81, and a perimeter edge 82 extending around the bottom plate 54 between the upper and lower surfaces 80 and 81. The bottom plate 54 is generally hexagonal prismatic, such that the perimeter edge 82 includes six sides which correspond in dimension to the hexagonal inner surface 43 of the sidewall 12 of the housing 11 into which the bottom plate 54 is snug fit as part of the cartridge 24. The snug fit between the bottom plate 54 and the inner surface 43 of the sidewall 12 prevents water from flowing from the inlet 22 to the outlets 23 around the cartridge 24. The bottom plate 54 includes a depending lip 83 formed on the lower surface 81 thereof, which lip 83 fits into a groove in the bottom 13 of the housing 11 to further lock the cartridge 24 in place and prevent water from flowing around the underside of the cartridge 24. The bottom plate 54 has a relatively thin profile.

The bottom plate 54 includes six apertures 83. The apertures 83 are identical in every way other than location, and so only one aperture 83 will be described and referenced herein specifically, with the understanding that the description is equally applicable to the other apertures 83 unless otherwise noted. Additionally, not every aperture 83 will be marked with reference characters, for the sake of clarity of the drawings. The aperture 83 is generally rectangular and extends vertically entirely through the bottom plate 54. The aperture 83 has an inner edge 84, an opposed outer edge 85, and opposed parallel sides 86 and 87. The inner edge 84 and the outer edge 85 are each curved such that the inner edge 84 forms a convex edge of the aperture 83 and the outer edge 85 forms a concave edge of the aperture 83. The sides 86 and 87 are parallel and arranged nearly radially with respect to the axis A. The sides 86 and 87 are generally transverse to the inner and outer edges 84 and 85.

As stated above, each of the apertures 83 is identical in structure. In location, the apertures 83 are spaced apart circumferentially about bottom plate 54, each separated by a solid wedge 90. Each wedge 90 is formed integrally and monolithically as part of the bottom plate 54. The wedges 90 are identical in every way other than location, and so only one wedge 90 will be described and referenced herein specifically, with the understanding that the description is equally applicable to the other wedges 90 unless otherwise noted. Additionally, not every wedge 90 will be marked with reference characters for the sake of clarity of the drawings. The wedge 90 has an inner end 91 and an outer end 92. The inner end 91 is proximate to the geometric center of the bottom plate 54 and is defined between the inner edges 84 of two adjacent apertures 83. The outer end 92 is proximate to the perimeter edge 62 and is defined between the outer edges 85 of the same two adjacent apertures 83. The inner end 91 is narrower than the outer end 92, such that the wedge 90 expands in width from the inner end 91 to the outer end 92. The inner end 91 is approximately one-sixth the circumferential width of the inner edge 84 of one of the apertures 83. The outer end 92 is approximately two-thirds the circumferential width of the outer edge 85 of one of the apertures 83. Thus, the horizontal area of the wedge 90 is approximately one third the horizontal area of one of the apertures 83.

The bottom plate 54 includes several posts through which fasteners are applied so as couple the bottom plate 54 to the top plate 53. The bottom plate 54 also includes a socket 93 located centrally on the upper surface 80 of the bottom plate 54 which extends into the bottom plate 54 from the upper surface 80 and is sized to receive the axle 32. Opposed from the socket 93, the bottom plate 54 has a post 94 extending downwardly from center of the lower surface 81, which fits into and is seated in the bottom 13 of the housing 11. When applied to the bottom 13 of the housing 11, each of the apertures 83 is aligned with one of outlets 23 in the housing 11. The bottom plate 54 includes an upstanding guide lip 95 extending upwardly from the upper face 80 proximate to the socket 93; the guide lip 95 maintains rotational alignment of the disc 33, as will be explained. The bottom plate 54 also includes an upstanding circumferential lip 96 which contains the disc 33, in cooperation with the lip 76 formed on the lower surface 61 of the top plate 53.

Disposed between the top and bottom plates 53 and 54 in the cartridge 24 is the disc 33. The disc 33 is mounted in the cartridge 24 for rotation about the axle 32 in response to actuation of the drive assembly. As described above, relatively fast rotation of the impeller 25 imparts rotation to the central and offset gears 50 and 51 of the reduction cassette 31, which imparts reduced and relatively slow rotation to the disc 33, which moves the port 34 sequentially into and out of alignment with each of the apertures 63 and in the top and bottom plates 53 and 54, so as to sequentially open and close each of the outlets 23. In this manner, the disc 33 controls the opening and closing of the outlets 23, thereby directing the flow of water through the valve 10 from the inlet 22 to each of the outlets 23.

The disc 33 includes an upper surface 100, a lower surface 101, and a peripheral edge 102 extending continuously around the disc 33 between the upper and lower surfaces 100 and 101. The disc 33 is circular and has a thin profile. The peripheral edge 102 of the disc 33 corresponds to the lip 76 on the lower surface 61 of the top plate 53 and the outer lip 96 on the upper surface 81 of the bottom plate 54. The disc 33 includes the port 34, and in the preferred embodiment shown throughout the drawings, there is only one port 34. The port 34 is formed entirely through the disc 33 from the upper surface 100 through to the lower surface 101. The port 34 corresponds in shape to the apertures 63 and 83 and is generally rectangular. The port 34 has an inner edge 104, an opposed outer edge 105, and opposed parallel sides 106 and 107. The inner edge 104 and the outer edge 105 are each curved such that the inner edge 104 forms a convex edge of the port 34 and the outer edge 105 forms a concave edge of the port 34. The sides 106 and 107 are parallel and arranged nearly radially with respect to the axis A. The sides 106 and 107 are generally transverse to the inner and outer edges 104 and 105.

The disc 33 has an elevated gear 110 coaxial to the axis A and preferably formed integrally to the disc 33. The gear 110 has a bore formed centrally therethrough to receive the axle 32 when the valve 10 is assembled. The gear 110 extends through the central bore 55 formed in the top plate 53 above the upper surface 61 of the top plate 53 and meshingly engages with the offset gears 51 of the reduction cassette 31 so that rotation of the offset gears 51 imparts rotation to the gear 110 and the disc 33.

The disc 33 further includes a circular track 103 formed into the lower surface 101 of the disc 33. The track 103 receives the circular, upstanding guide lip 95 when the disc 33 is carried on the bottom plate 54. Cooperation of the track 103 and the guide lip 95 guides rotation of the disc 33 and limits lateral movement of the disc 33 within the cartridge 24.

As seen in FIGS. 3, 4, 5A, and 5B, when the cartridge 24 is assembled, each of the apertures 63 in the top plate 53 is aligned with a corresponding one of the apertures 83 in the bottom plate 54, thus forming a "set of apertures 63 and 83." As described above, the apertures 83 in the bottom plate 54 are aligned with the outlets 23 in the valve 10, such that each set of apertures 63 and 83 is also aligned with the outlets 23 in the valve 10. As the disc 33 rotates, it passes over the sets of apertures 63 and 83 to open and close the sets of apertures 63 and 83. Referring now to FIG. 3, as water enters the valve 10 from the inlet 22 along arrowed line W, the impeller 25 rotates in a counter-clockwise rotation, causing the central and offset gears 50 and 51 in the reduction cassette 31 to rotate. The reduction cassette 31, engaged with the gear 110 of the disc 33, causes the disc 33 to rotate, albeit much more slowly than the impeller 25. The rotating disc 33 sequentially moves the port 34 past each of the sets of apertures 63 and 83. The disc 33 thus moves among a plurality of positions; when the port 34 is aligned with a first set of apertures 63 and 83, the port 34 corresponds to the set of apertures 63 and 83, and couples the interior 15 of the valve 10 in fluid communication with the outlet 23 with which the set of apertures 63 and 83 is aligned. Water may thus flow uninterrupted from the interior 15 through the aperture 63 in the top plate 53, through the port 34 in the disc 33, through the aperture 83 in the bottom plate 54, and then exit out the outlet 23, as shown by the line X in FIG. 3. The outlet 23 is thereby fully opened.

Rotation of the disc 33 slowly moves the port 34 out of position and out of alignment with the set of apertures 63 and 83 and thus slowly closes the outlet 23 aligned with that set of apertures 63 and 83. To distinguish from the set of apertures 63 and 83 and the outlet 23 which is being closed, the port 34 moves toward an "adjacent" set of apertures 63 and 83 which are aligned with an "adjacent" outlet 23. As the port 34 is rotated out of alignment, the side 106 of the port 34 moves away from the sides 66 and 86 of the apertures 63 and 83, respectively, and over the wedges 70 and 90 in the top and bottom plates 53 and 54, respectively. Likewise, the opposed side 107 moves away from the sides 67 and 87 of the apertures 63 and 83, respectively, and over the apertures 63 and 83 themselves. The approximately one-third surface area of the wedges 70 and 90, compared with that of the apertures 63 and 93, together with the wide inner ends 71 and 91 of the wedges 70 and 90, provides the valve 10 with a unique timing feature. In other valves, water is nearly always simultaneously passed through one valve and an adjacent valve, or "shared" between adjacent valves. However, the valve 10 delays sharing between valves for a considerable amount of time. The port 34 is able to move approximately one third of the way out of one of the sets of apertures 63 and 83 before any water is passed through the adjacent set of apertures 63 and 93. This provides a more dedicated flow of water out of each outlet 23 to each in-floor cleaning head for a longer amount of time than has been conventionally available.

The disc 33 continues rotation to place the port 34 over the adjacent set of apertures 63 and 83 to open the adjacent outlet 23 aligned with that adjacent set of apertures 63 and 83. When the port 34 is aligned over the adjacent set of apertures 63 and 83, water may flow uninterrupted from the interior 15 through the adjacent aperture 63 in the top plate 53, through the port 34 in the disc 33, through the adjacent aperture 83 in the bottom plate 54, and then exit out the adjacent outlet 23. The adjacent outlet 23 is thereby fully open. Rotation of the disc 33 continues, thereby slowly and sequentially opening and closing all of the outlets 23 to communicate water to the in-floor cleaning heads installed throughout the pool.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:
1. A water distribution valve for directing a flow of water through a swimming pool cleaning system, the water distribution valve comprising:
   a housing having an inlet, a plurality of outlets, and an inner surface bounding and defining an interior coupled in fluid communication with the inlet and the plurality of outlets;

a cartridge including top and bottom plates, and having a plurality of spaced-apart apertures corresponding to the plurality of outlets of the housing;

a disc including a port, the disc mounted for rotation in the housing between the top and bottom plates for movement among a plurality of positions, each position of the disc characterized by the port being aligned with a respective one of the plurality of outlets;

a drive assembly carried by the housing and operably coupled to impart rotation to the disc; and application of the flow of water into the housing actuates the drive assembly, thereby imparting rotation to the disc through the plurality of positions;

wherein the disc is disposed in spaced relation away from the inner surface of the housing.

2. The water distribution valve of claim 1, wherein each of the plurality of positions of the disc is further characterized by the port being aligned with a respective one of the plurality of spaced-apart apertures in the cartridge.

3. The water distribution valve of claim 2, further including wedges formed between each of the apertures, wherein each wedge is approximately one-third the size of each aperture.

4. The water distribution valve of claim 1, wherein the cartridge spaces the disc apart from the inner surface of the housing.

5. The water distribution valve of claim 1, wherein the drive assembly includes an impeller coupled to the disc to impart rotation to the disc in response to application of the flow of water into the housing.

6. The water distribution valve of claim 1, further comprising:
the housing has a sidewall; and
the disc is disposed in spaced relation away from the sidewall of the housing.

7. The water distribution valve of claim 1, further comprising:
the housing has a sidewall; and
the drive assembly is disposed in spaced relation away from the sidewall of the housing.

8. A water distribution valve for directing a flow of water through a swimming pool cleaning system, the water distribution valve comprising:
a housing having an inlet, a plurality of outlets, and an inner surface bounding and defining an interior coupled in fluid communication with the inlet and the plurality of outlets;
a distribution assembly consisting of all moving parts of the valve, the distribution assembly comprising:
a cartridge including means for sequentially coupling and decoupling the inlet and outlets in fluid communication, a plurality of spaced-apart apertures corresponding to the plurality of outlets of the housing, and a disc mounted for rotation between top and bottom plates of the cartridge, the disc including a port which moves over each of the apertures to sequentially open and close the apertures corresponding to the plurality of outlets;
a drive assembly operably coupled to the cartridge to cause the cartridge to sequentially couple and decouple the inlet and outlets in fluid communication in response to application of the flow of water into the housing; and
the distribution assembly is disposed in the interior of the housing away from the inner surface.

9. The water distribution valve of claim 8, further comprising:
the housing has a sidewall; and
the cartridge is disposed in spaced relation away from the sidewall of the housing.

10. The water distribution valve of claim 8, wherein the cartridge spaces the disc apart from the inner surface of the housing.

11. The water distribution valve of claim 8, wherein the distribution assembly includes an impeller coupled to the disc to impart rotation to the disc in response to application of the flow of water into the housing.

12. A water distribution valve for directing a flow of water through a swimming pool cleaning system, the water distribution valve comprising:
a housing having an inlet, outlets, and an inner surface bounding and defining an interior coupled in fluid communication with the inlet and the outlets;
an operational assembly carried within the interior for diverting fluid from the inlet to the outlets, wherein the operational assembly includes a cartridge having a plurality of spaced-apart apertures corresponding to the plurality of outlets of the housing, and a disc mounted for rotation in the cartridge between top and bottom plates of the cartridge, the disc including a port which moves over each of the apertures to sequentially open and close the apertures; and
the operational assembly is disposed in spaced relation away from the inner surface of the housing.

13. The water distribution valve of claim 12, wherein the operational assembly is mounted for rotational movement.

14. The water distribution valve of claim 12, further comprising wedges formed between each of the apertures, wherein each wedge is approximately one-third the size of each aperture.

15. The water distribution valve of claim 12, wherein the cartridge spaces the disc apart from the inner surface of the housing.

16. The water distribution valve of claim 12, wherein an impeller is coupled to the disc to impart rotation to the disc in response to application of the flow of water into the housing.

17. The water distribution valve of claim 12, further comprising:
the housing has a sidewall; and
the cartridge is disposed in spaced relation away from the sidewall of the housing.

* * * * *